(12) United States Patent
Ohara (10) Patent No.: US 12,385,587 B2
(45) Date of Patent: Aug. 12, 2025

(54) CONNECTOR CONNECTION STRUCTURE

(71) Applicant: TOYOTA JIDOSHA KABUSHIKI KAISHA, Aichi-ken (JP)

(72) Inventor: Yukihiro Ohara, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/329,580

(22) Filed: Jun. 6, 2023

(65) Prior Publication Data

US 2023/0417351 A1 Dec. 28, 2023

(30) Foreign Application Priority Data

Jun. 28, 2022 (JP) ................................ 2022-103762

(51) Int. Cl.
| | |
|---|---|
| *F16L 37/373* | (2006.01) |
| *F16L 37/113* | (2006.01) |
| *F16L 37/47* | (2006.01) |

(52) U.S. Cl.
CPC .......... *F16L 37/373* (2013.01); *F16L 37/113* (2013.01); *F16L 37/47* (2013.01); *Y02E 60/32* (2013.01)

(58) Field of Classification Search
CPC ....... F16L 37/373; F16L 37/47; F16L 29/002; F16L 37/113; F16L 37/44; Y02E 60/32
See application file for complete search history.

(56) References Cited

U.S. PATENT DOCUMENTS

| | | | | |
|---|---|---|---|---|
| 2,440,946 | A | * | 5/1948 | Hansen .................. F16L 29/002 137/628 |
| 2,948,553 | A | * | 8/1960 | Gill ........................ F16L 37/373 137/614.02 |
| 2,991,090 | A | * | 7/1961 | De Cenzo ............. F16L 37/373 285/321 |

(Continued)

FOREIGN PATENT DOCUMENTS

| | | |
|---|---|---|
| JP | 2007-523296 A | 8/2007 |
| JP | 2013-071778 A | 4/2013 |
| WO | WO-2019220068 A2 * | 11/2019 |

OTHER PUBLICATIONS

Akio Toyoda, Certificate a for the Application of Exception to Lack of Novelty of Invention, dated Jun. 30, 2022, Toyota Motor Corporation, The images in the certificate are captured from https://www.youtube.com/watch?v=Wsx1HM671Ac, 6pp.

(Continued)

*Primary Examiner* — David Colon-Morales
(74) *Attorney, Agent, or Firm* — HAUPTMAN HAM, LLP (57) ABSTRACT

The first connector includes a main body, a first connecting surface, a rotating ring, and a restricting pin for prohibiting the rotation of the rotating ring relative to the first connecting surface, the rotating ring, when taking a predetermined rotational phase with respect to the second connector, the second connector to the abutting position, can be drawn in the axial direction, further, the second connector is engaged with a portion of the second connector by rotating relative to the first connecting surface in a state of being retracted to the abutting position to maintain a connection state, the restricting pin, when the second connector is retracted to the abutting position, the rotation of the rotating ring from the restricting position to allow the rotation of the allowable position.

4 Claims, 6 Drawing Sheets

(56) References Cited

U.S. PATENT DOCUMENTS

| | | | | | |
|---|---|---|---|---|---|
| 3,159,180 | A | * | 12/1964 | Courtot | F16L 37/373 137/614.06 |
| 3,276,474 | A | * | 10/1966 | Gill | F16L 29/04 137/614.03 |
| 3,382,892 | A | * | 5/1968 | Cerbin | F16L 37/373 285/70 |
| 4,040,456 | A | * | 8/1977 | DeFrees | B67D 7/36 251/149.6 |
| 4,193,576 | A | * | 3/1980 | White | F16L 37/113 251/149.6 |
| 4,335,747 | A | * | 6/1982 | Mitsumoto | F16L 59/18 251/142 |
| 4,438,779 | A | * | 3/1984 | Allread | F16L 37/113 285/85 |
| 5,009,252 | A | * | 4/1991 | Faughn | F16L 37/32 285/91 |
| 5,332,001 | A | * | 7/1994 | Brown | F16L 37/36 251/96 |
| 5,488,972 | A | * | 2/1996 | McCracken | F16L 37/373 137/614.01 |
| 5,507,313 | A | * | 4/1996 | LeDevehat | F16L 37/62 137/614.05 |
| 5,595,217 | A | * | 1/1997 | Gillen | F16L 37/373 251/111 |
| 8,132,781 | B2 | * | 3/2012 | Haunhorst | F16L 37/373 251/149.9 |
| 8,662,108 | B2 | * | 3/2014 | Haunhorst | F16L 37/0841 251/248 |
| 8,814,137 | B2 | * | 8/2014 | Wong | F16L 37/18 251/149.9 |
| 8,887,762 | B2 | * | 11/2014 | Densel | F16L 37/36 251/149.9 |
| 8,967,177 | B2 | * | 3/2015 | Haunhorst | F16L 37/36 137/614.01 |
| 11,306,828 | B2 | * | 4/2022 | Chen | F16K 27/067 |
| 11,879,581 | B2 | * | 1/2024 | Koller | F16L 37/36 |
| 2006/0038401 | A1 | * | 2/2006 | Kleinbeckel | F16L 59/141 285/321 |
| 2007/0155224 | A1 | * | 7/2007 | Marot | F16L 37/30 439/491 |
| 2013/0291958 | A1 | | 11/2013 | Takanohashi et al. | |

OTHER PUBLICATIONS

Youtube video, posted Jan. 13, 2021, BMW Hydrogen 7—Development and Testing, URL https://www.youtube.com/watch?v=pdq_Zdu6cV4, 7 pp.

* cited by examiner

CONNECTOR CONNECTION STRUCTURE

CROSS-REFERENCE TO RELATED APPLICATION

This application claims priority to Japanese Patent Application No. 2022-103762 filed on Jun. 28, 2022, incorporated herein by reference in its entirety.

BACKGROUND

1. Technical Field

The present specification discloses a connector connection structure that connects a first connector provided for one of a supply source and a reservoir of liquid hydrogen and a second connector provided for the other of the supply source and the reservoir.

2. Description of Related Art

There may be a case where hydrogen is supplied from a supply source to a reservoir while in a liquid state. For example, in some hydrogen stations, hydrogen is received and stored in a liquid state from a tank truck that is a supply source. Typically, the supply source is provided with a first connector and the reservoir is provided with a second connector connectable to the first connector. Connecting the first connector and the second connector makes it possible to supply the liquid hydrogen from the supply source to the reservoir.

SUMMARY

The first connector and the second connector need to be connected in a liquid-tight manner so as to appropriately supply the liquid hydrogen. In order to enable such a connection, in some cases, a technique has been proposed in which the first connector is screwed and fastened to the second connector in a state where the first connector is in close contact with the second connector. However, in this case, a connection operation becomes very complicated, and the connection operation is thus time consuming.

Japanese Unexamined Patent Application Publication No. 2013-071778 (JP 2013-071778 A) discloses a technique for taking out a liquid stored in a tank. However, the technique disclosed in JP 2013-071778 A utilizes a siphon effect, and thus it is difficult to apply the technique to supply of the liquid hydrogen.

Therefore, the present specification discloses a connection structure in which the first connector and the second connector used for supplying the liquid hydrogen can be connected more easily.

A connector connection structure disclosed in the present specification is a connector connection structure that connects a first connector provided for one of a supply source and a reservoir of liquid hydrogen and a second connector provided for the other of the supply source and the reservoir. The first connector includes a main body, a first connecting surface that is fixed to the main body and abuts a second connecting surface of the second connector, a rotating ring that surrounds the first connecting surface and is rotatable with respect to the first connecting surface, and a restricting pin that prohibits a rotation of the rotating ring with respect to the first connecting surface.

When the rotating ring takes a predetermined rotational phase with respect to the second connector, the rotating ring is able to pull in the second connector in an axial direction to an abutting position at which the second connecting surface abuts the first connecting surface, and further, rotates with respect to the first connecting surface in a state where the second connector is pulled in to the abutting position and partially engages with the second connector so as to maintain a connection state.

When the second connector is pulled in to the abutting position, the restricting pin moves from a restricting position at which the rotation of the rotating ring is prohibited to an allowable position at which the rotation of the rotating ring is allowed.

According to the technique disclosed in the present specification, it is possible to easily perform a positioning operation of the rotational phase of the rotating ring with respect to the second connector and an engagement operation between the rotating ring and the second connector. As a result, according to the technique disclosed in the present specification, the first connector and the second connector used for supplying the liquid hydrogen can be connected more easily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
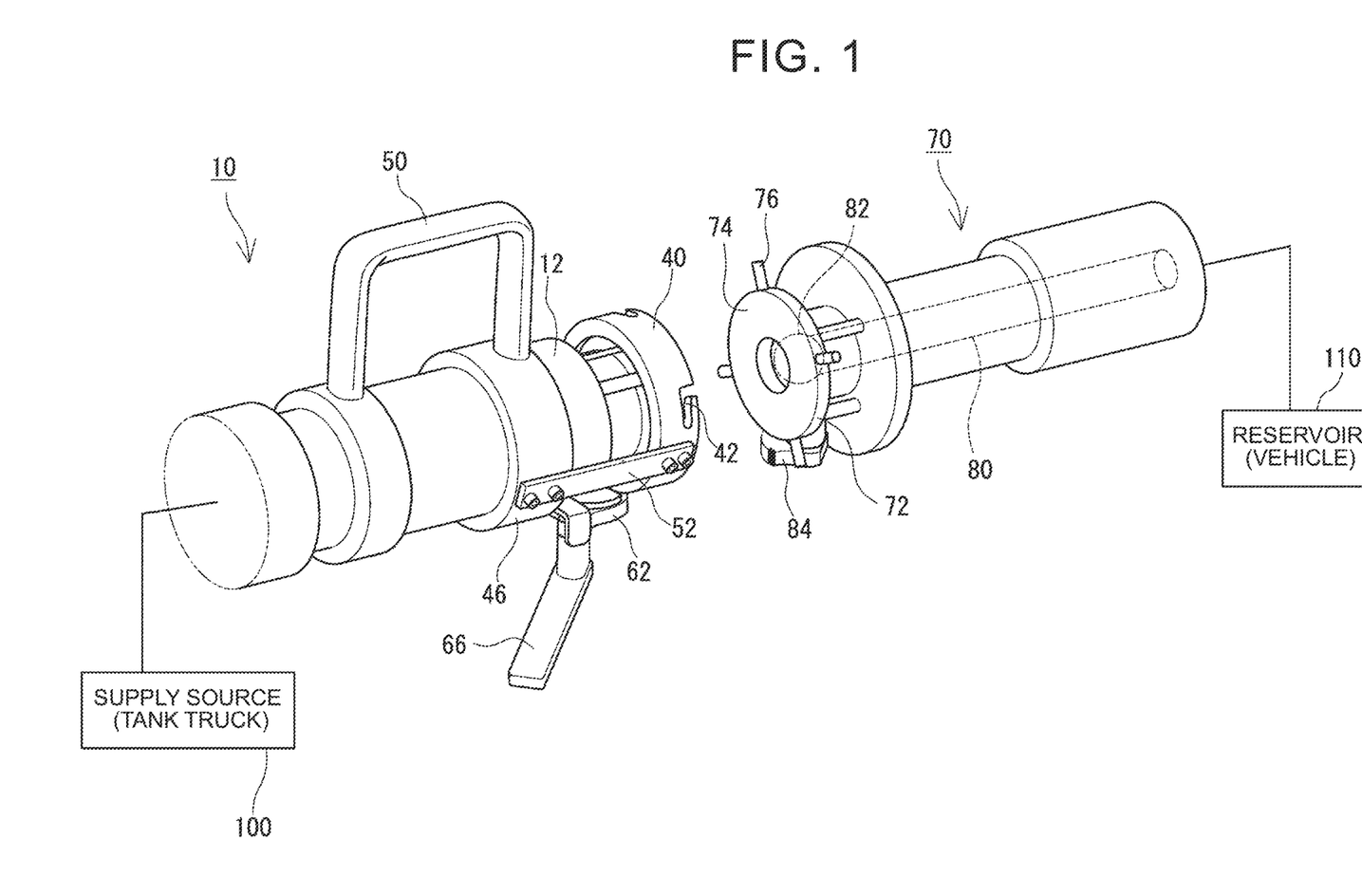
FIG. 1 is a perspective view of a first connector and a second connector.
Figure 2:
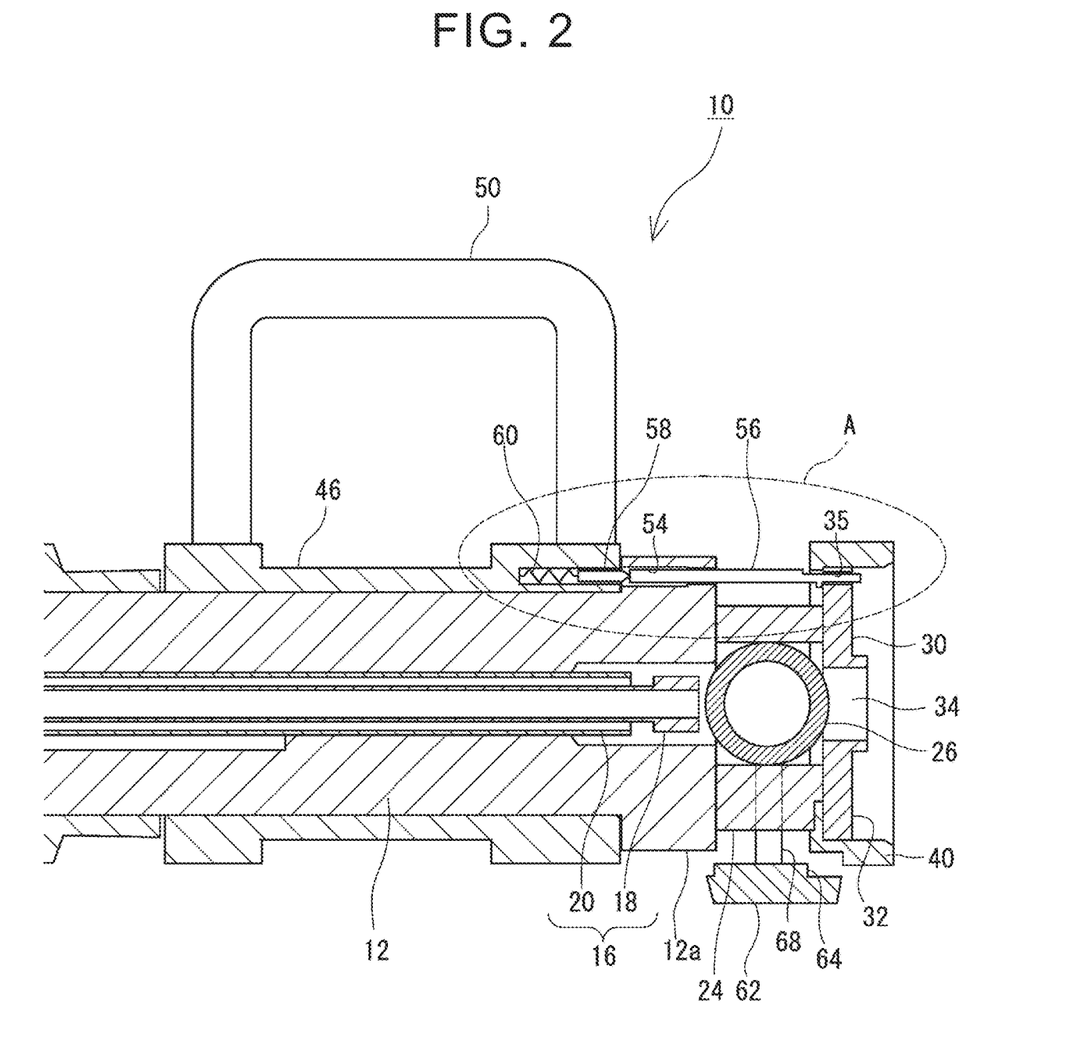
FIG. 2 is a cross-sectional view of the first connector.

Hereinafter, a connector connection structure will be described with reference to the drawings. FIG. 1 is a perspective view of a first connector 10 and a second connector 70. FIG. 2 is a cross-sectional view of the first connector 10. The first connector 10 is connected to a supply source 100 of liquid hydrogen. The second connector 70 is connected to the liquid hydrogen reservoir 110. When the liquid hydrogen is supplied from the supply source 100 to the reservoir 110, the first connector 10 and the second connector 70 are connected in a liquid-tight manner. If the reservoir 110 is a fuel cell vehicle or a hydrogen engine vehicle, the supply source 100 is a hydrogen tank of a hydrogen station or a tank lorry that transports liquid hydrogen. When the reservoir 110 is a hydrogen tank of a hydrogen station, the supply source 100 is a tank truck. Alternatively, the second connector 70 may be provided in the supply source 100 and the first connector 10 may be provided in the reservoir 110.

The first connector 10 includes a main body 12. As shown in FIG. 2, the main body 12 has a radially overhanging flange portion 12a at its distal end. A first flow path 16 is formed inside the main body 12. The first flow path 16 includes a gas pipe 20 and a liquid pipe 18 disposed inside the gas pipe 20. That is, the first flow path 16 has a double tube structure. The liquid hydrogen flows through the inside of the liquid pipe 18 to the second connector 70. The vaporized hydrogen gas is sucked to the supply source 100 side through the gap between the liquid pipe 18 and the gas pipe 20.

As shown in FIG. 2, a first connecting plate 30 is provided at the end of the first connector 10 (i.e., the end on the second connector 70 side). The first connecting plate 30 is mechanically connected to the main body 12 via an intermediate tube 24. Therefore, the first connector 10 does not rotate with respect to the main body 12. The end surface of the first connecting plate 30 functions as a first connecting surface 32 to which a second connecting plate 72 to be described later abuts. A center hole 34 is formed in the center of the first connecting plate 30. A first valve 26 is disposed between the center hole 34 and the first flow path 16. The first valve 26 is a ball valve. The first valve 26 rotates about the rotation shaft 68 to thereby communicate or disconnect the center hole 34 and the first flow path 16.

The rotating ring 40 is a cylindrical member that surrounds the first connecting plate 30. As shown in FIG. 1, the rotating ring 40 is mechanically coupled to the rotating body 46 via a connecting bar 52. As shown in FIGS. 1 and 2, the rotating body 46 is a tubular member that surrounds the periphery of the main body 12. A handle 50 gripped by an operator is fixed to a peripheral surface of the rotating body 46. The rotating body 46 is not fixed to the main body 12. Therefore, the rotating body 46, the handle 50, and the rotating ring 40 are rotatable with respect to the main body 12 and the first connecting surface 32. When the restricting pin 58, which will be described later, is in the predetermined restricting position, the rotation of the rotating ring 40 with respect to the main body 12 is restricted.

Figure 3:
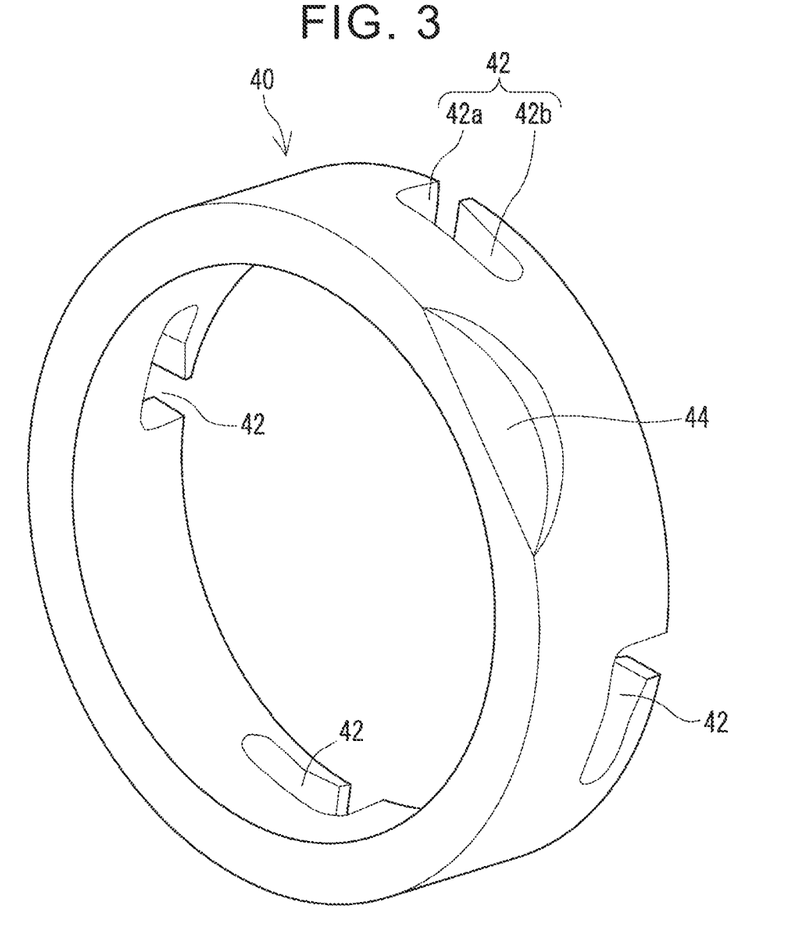
FIG. 3 is a perspective view of a rotating ring.

FIG. 3 is a perspective view of the rotating ring 40. As shown in FIG. 3, four engagement recesses 42 are formed in the rotating ring 40. The engagement recess 42 is a substantially L-shaped notch that advances in the axial direction from the end of the rotating ring 40 (that is, the end closer to the first connector 10) and then travels in the circumferential direction. Hereinafter, a portion of the engagement recess 42 that advances in the axial direction is referred to as an "inlet 42a", and a portion that advances in the circumferential direction is referred to as a "tail 42b".

When the first connector 10 is brought close to the second connector 70 with the rotational phase of the engaging pin 76 (see FIG. 1) of the second connector 70 matched to the rotational phase of the inlet 42a, the engaging pin 76 enters the interior of the inlet 42a. As a result, the second connector 70 is drawn in the axial direction to the predetermined abutting position. In the abutting position, the second connecting surface 74 abuts against the first connecting surface 32. When the second connector 70 is retracted to the abutting position and the rotating ring 40 is further rotated with respect to the first connecting surface 32, the engaging pin 76 enters the tail 42b and engages the tail 42b. This engagement maintains the second connecting surface 74 in contact with the first connecting surface 32.

A receiving recess 44 is further formed in a part of the rotating ring 40 in the circumferential direction. The receiving recess 44 is configured by partially reducing the thickness of the peripheral wall of the rotating ring 40. The receiving recess 44 receives an interlocking member 64, which will be described later.

As shown in FIG. 2, the first valve 26 is connected to the interlocking member 64 and the first gear 62 via the rotation shaft 68. An opening-closing lever 66 (see FIG. 1) is connected to an end portion of the first gear 62. When the opening-closing lever 66 is swung, the first gear 62, the interlocking member 64, and the rotation shaft 68 are rotated, and the rotation shaft 68 is rotated, whereby the first valve 26 is opened and closed. That is, the first valve 26 is opened and closed by swinging the opening-closing lever 66. When the first connector 10 is connected to the second connector 70, the first gear 62 meshes with a second gear 84, which will be described later.

The interlocking member 64 is a non-circular member integrated with the first gear 62 on the upper surface of the first gear 62. This interlocking member 64 suppresses improper opening of the first valve 26 and improper disconnection of the connector. The interlocking member 64 will be described in detail later.

Figure 4:
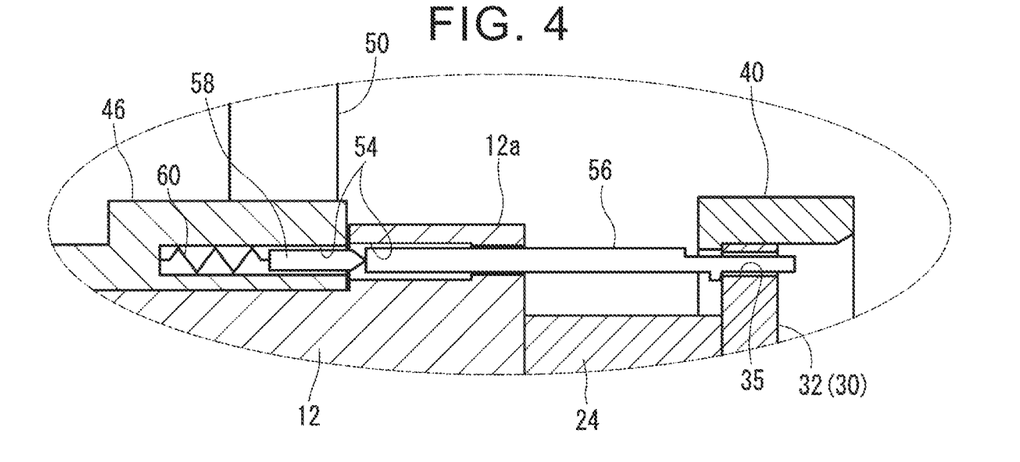
FIG. 4 is an enlarged view of the section A of FIG. 2 with the restricting pin in the restricting position.
Figure 5:
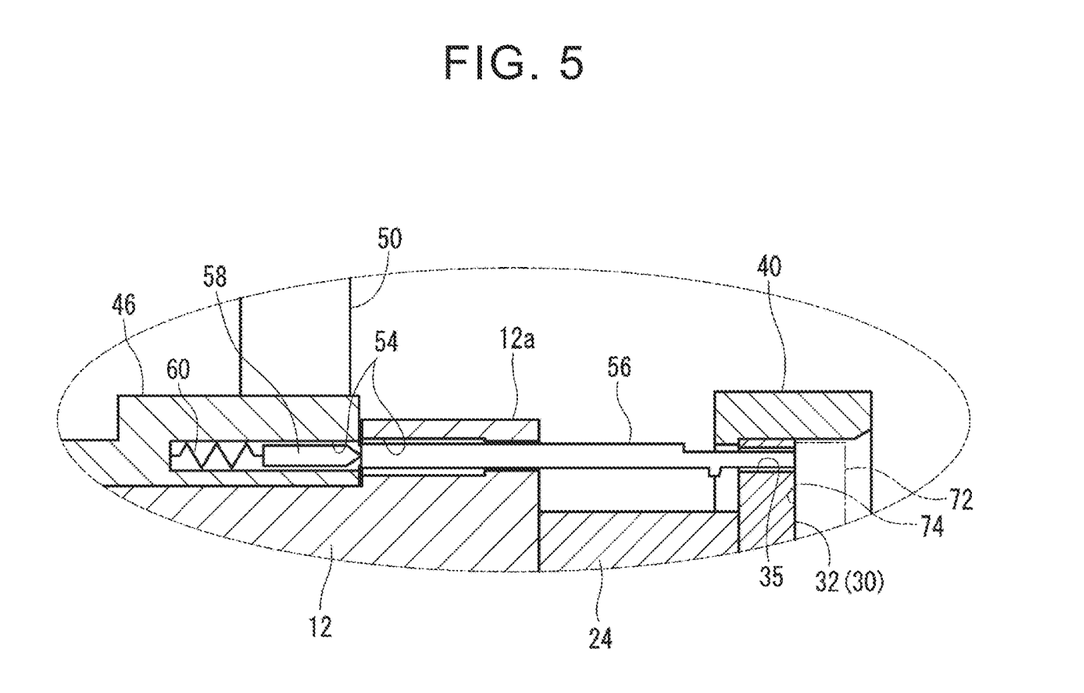
FIG. 5 is an A part enlarged view of the FIG. 2 in the state where a restricting pin is in an allowable position

FIG. 4 and FIG. 5 are enlarged views of the section A of FIG. 2. As shown in FIGS. 4 and 5, the first connector 10 includes a pin hole 54, a pressing pin 56, a restricting pin 58, and a spring 60. The pin hole 54 is a hole elongated in the axial direction. The pin hole 54 extends over both the rotating body 46 and the flange portion 12a of the main body 12. The restricting pin 58 is disposed inside the pin hole 54. The restricting pin 58 moves forward and backward between a restricting position for restricting the relative rotation of the rotating ring 40 with respect to the main body 12 and an allowable position for permitting the relative rotation.

When the restricting pin 58 is in the restricting position, the restricting pin 58 straddles both the rotating body 46 and the main body 12. FIG. 4 shows a state in which the restricting pin 58 is in the restricting position. When the restricting pin 58 is in the restricting position, the rotation of the rotating body 46 with respect to the main body 12 is restricted, and the rotation of the rotating ring 40 with respect to the first connecting surface 32 is restricted.

When the restricting pin 58 is in the allowable position, the restricting pin 58 is completely inside the rotating body 46 and completely detached from the main body 12. FIG. 5 illustrates a state in which the restricting pin 58 is in an allowable position. The spring 60 biases the restricting pin 58 in the restricting position direction. When the restricting pin 58 is in the allowable position, rotation of the rotating body 46 with respect to the main body 12 is permitted, and rotation of the rotating ring 40 with respect to the first connecting surface 32 is also permitted.

The pressing pin 56 is a pin arranged on the axial end side with respect to the restricting pin 58. The first connecting plate 30 is formed with a passage hole 35 through which the pressing pin 56 passes. The proximal end portion of the pressing pin 56 is inserted into the pin hole 54, and the distal end portion of the pressing pin 56 is inserted into the passage hole 35. As shown in FIG. 4, when the restricting pin 58 is in the restricting position, the distal end of the pressing pin 56 protrudes outward from the first connecting surface 32. As shown in FIG. 5, when the second connecting surface 74 is pressed against the first connecting surface 32, the pressing pin 56 and the restricting pin 58 are moved back to the axial proximal end side in a chain manner. As a result, the restricting pin 58 moves to the allowable position.

Next, the second connector 70 will be described. As shown in FIG. 1, a second flow path 80 through which liquid hydrogen and hydrogen gas pass is formed inside the second connector 70. A second valve 82 is provided in the second flow path 80. A second gear 84 is connected to the second valve 82 via a rotation shaft (not shown). When the first connector 10 is coupled to the second connector 70, the second gear 84 meshes with the first gear 62. Then, the first valve 26 and the second valve 82 are synchronously opened and closed by swinging the opening-closing lever 66 in a state where the second gear 84 is meshed with the first gear 62.

A second connecting plate 72 is provided at the end of the second connector 70 (that is, at the end portion on the side of the first connector 10). The end surface of the second connecting plate 72 functions as a second connecting surface 74 that abuts against the first connecting surface 32. The four engaging pins 76 extend in the radial direction from the circumferential surface of the second connecting plate 72. The form of the engagement recess 42 and the engaging pin 76 may be changed. For example, the engagement recess 42 may be a groove instead of a notch. Further, the engaging pin 76 may be provided in the first connector 10, the engagement recess 42 may be provided in the second connector 70, respectively.

Next, a procedure for connecting the first connector 10 and the second connector 70 will be described. When the connector is connected, the operator grasps the handle 50 so that the rotational phase of the inlet 42a of the engagement recess 42 matches the rotational phase of the engaging pin 76. If the rotational phase can be adjusted appropriately, the operator moves the first connector 10 axially and causes the engaging pin 76 to enter the inlet 42a. As a result, the second connector 70 is axially retracted to the predetermined abutting position.

When the second connector 70 is retracted to the abutting position, the second connecting surface 74 comes into contact with the first connecting surface 32, and the pressing pin 56 is pressed in the proximal direction. As a result, the restricting pin 58 is retracted from the restricting position to the allowable position. When the restricting pin 58 reaches the allowable position, the rotation of the rotating ring 40 with respect to the first connecting surface 32 is permitted. In this state, the operator rotates the rotating ring 40 with respect to the first connecting surface 32. As a result, the engaging pin 76 enters the tail 42b of the engagement recess 42. In this state, the movement of the second connector 70 in the axial direction with respect to the first connector 10 is restricted, so that the contact state between the first connecting surface 32 and the second connecting surface 74 is maintained. Then, in this state, the connection operation between the first connector 10 and the second connector 70 is completed.

Here, as is obvious from the above description, in the present example, the rotation of the rotating ring 40 with respect to the main body 12 is restricted in a state where the second connecting surface 74 does not come into contact with the first connecting surface 32. Further, in a state in which the second contact surface is in contact with the first connecting surface 32, the rotation of the rotating ring 40 with respect to the main body 12 is allowed. The reason for such a configuration will be described.

If the rotating ring 40 is always rotatable with respect to the main body 12, the rotating ring 40 will swing and move relative to the main body 12, making it difficult to align the rotational phase of the rotating ring 40 with respect to the second connector 70. On the other hand, when the rotating ring 40 is not rotatable with respect to the main body at all times, the main body 12 itself needs to be rotated with the first connecting surface 32 abutting against the second connecting surface 74 in order to engage the engaging pin 76 in the tail 42b. However, when the main body 12 is to be rotated, the first connecting plate 30 connected to the main body 12 is tilted or moved in the axial direction. Therefore, it is difficult to rotate the main body 12 while maintaining the contact state between the first connecting surface 32 and the second connecting surface 74. Further, when the rotating ring 40 cannot rotate with respect to the main body 12, the first connecting plate 30 rotates with respect to the second connecting plate 72 while being in contact with the second connecting plate 72. In this case, the first connecting plate 30 and the second connecting plate 72 rub against each other, which leads to wear of the first connecting surface 32 and the second connecting surface 74.

On the other hand, in the case of the configuration in which the rotating ring 40 does not rotate with respect to the main body 12 when the first connecting surface 32 does not abut against the second connecting surface 74 as in the present example, the operation of positioning the rotation phase of the rotating ring 40 with respect to the second connector 70 is facilitated. Further, according to the present example, in a state in which the first connecting surface 32 is in close contact with the second connecting surface 74, the rotating ring 40 can be rotated without rotating the main body 12 and the first connecting plate 30. As a result, the second connector 70 can be engaged with the first connector 10 in a relatively simple operation.

Next, the interlock function in the present example will be described. The connector connection structure of the present example has an interlock function to suppress both the first valve 26 from being released at an improper timing and the connector from being released at an improper timing. This interlock function will be described referring to FIGS. 6A to 7C of the drawings.

Figure 6A:
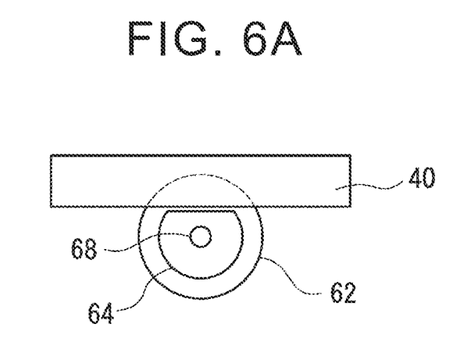
FIG. 6A is a view illustrating the interlocking member and the receiving recess when the first valve is closed.
Figure 6B:
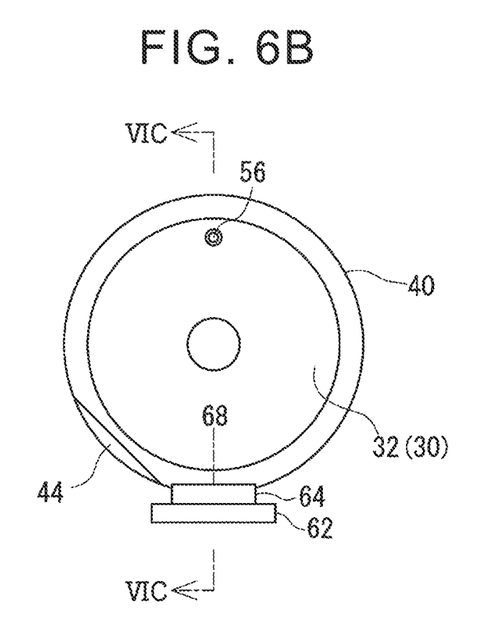
FIG. 6B is another view illustrating the positional relation of the interlocking member and the receiving recess with the first valve closed.
Figure 6C:
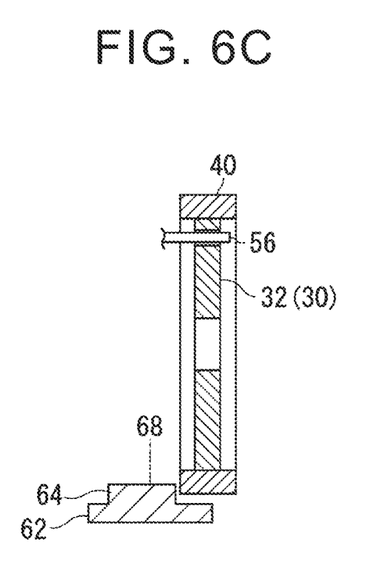
FIG. 6C is another view illustrating the positional relation of the interlocking member and the receiving recess with the first valve closed.
Figure 7A:
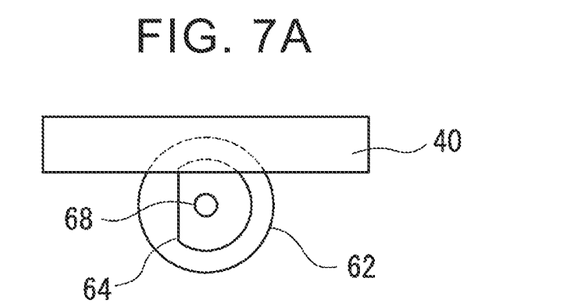
FIG. 7A is a view for explaining a positional relation between an interlocking member and a receiving recess in a state where a first valve is opened.
Figure 7B:
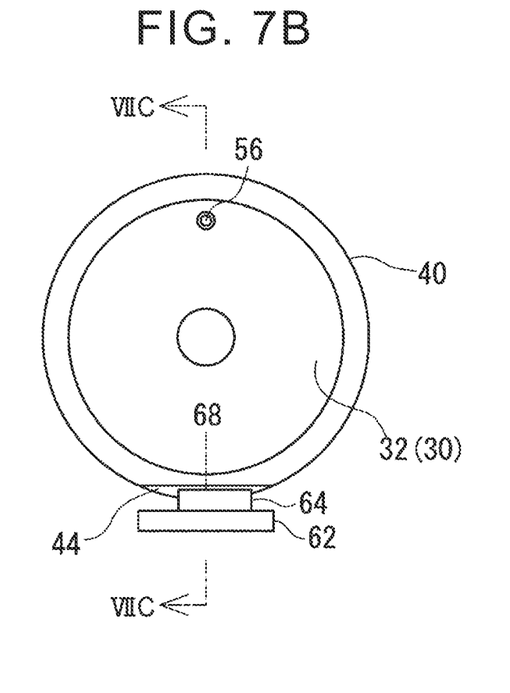
FIG. 7B is another view illustrating the positional relation of the interlocking member and the receiving recess with the first valve open.
Figure 7C:
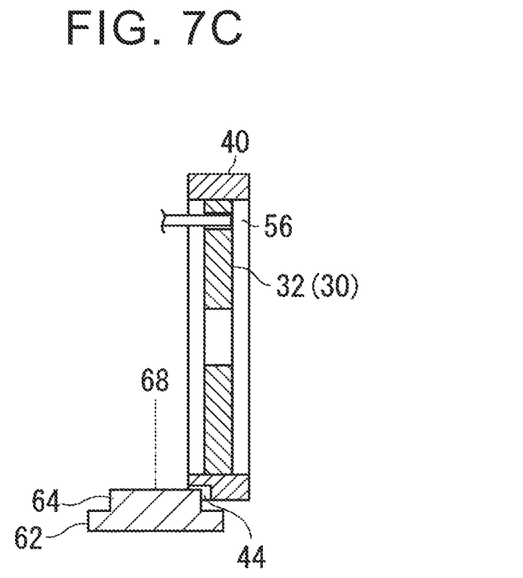
FIG. 7C, while opening the first valve is another view for explaining the positional relation of the interlocking member and the receiving recess.

FIGS. 6A to 7C are schematic three-sided views of the rotating ring 40 and the interlocking member 64. In FIGS. 6A to 7C, FIG. 6A is a plan view of the rotating ring 40. FIG. 7A is a plan view of an interlocking member 64. Further, FIG. 6B is a rear view of the rotating ring 40. 7B is a rear view of the interlocking member 64. Further, FIG. 6C is a VIC-VIC cross-sectional view, and FIG. 7C is a VIIC-VIIC cross-sectional view.

FIGS. 6A to 6C show the first valve 26 in a closed state, and FIGS. 7A to 7C show the first valve 26 in an open state. As shown in FIGS. 6A to 7C, the interlocking member 64 is non-circular in plan view and is eccentric with respect to the rotation shaft 68. The interlocking member 64 is positioned in a predetermined closed position when the first valve 26 is closed and is positioned in a predetermined open position when the first valve 26 is open. As shown in FIGS. 6A to 6C, when the first valve 26 is in the closed position, the entire interlocking member 64 is axially outward of the rotating ring 40. Further, as shown in FIGS. 7A to 7C, when the rotating ring 40 is in the open position, the axial range of the interlocking member 64 partially overlaps with the axial range of the rotating ring 40.

Further, as described above, the rotating ring 40 rotates with respect to the first connecting plate 30. Hereinafter, the rotational phase when the engaging pin 76 enters the inlet 42a of the engagement recess 42 is referred to as an "initial rotational phase", and the rotational phase when the engaging pin 76 advances to the end of the engagement recess 42 is referred to as a "connection rotational phase". In the illustrated FIGS. 6A to 6C, the rotating ring 40 is in an initial rotational phase, and in the illustrated FIGS. 7A to 7C, the rotating ring 40 is in a connection rotational phase.

As shown in FIGS. 6A to 6C, in the initial rotational phase, the receiving recess 44 of the rotating ring 40 is in a position not axially opposed to the interlocking member 64. In this case, even if the first valve 26 is opened and the interlocking member 64 is moved to the open position, the interlocking member 64 interferes with the rotating ring 40. In other words, in a state in which the connection between the first connector 10 and the second connector 70 is not completed, the interlocking member 64 interferes with the rotating ring 40, and thus the first valve 26 cannot be opened.

Further, as shown in FIGS. 7A to 7C, at the connection rotational phase, the receiving recess 44 of the rotating ring 40 is axially opposed to the interlocking member 64. Here, as shown in FIGS. 7A to 7C, when the interlocking member 64 is moved to the open position, a portion of the interlocking member 64 is received in the receiving recess 44. In other words, when the rotating ring 40 is in the connection rotational phase, the interlocking member 64 does not interfere with the rotating ring 40 even if the first valve 26 is opened. In other words, when the connection between the first connector 10 and the second connector 70 is completed, interference between the interlocking member 64 and the rotating ring 40 does not occur, so that the first valve 26 can be opened.

In addition, when the interlocking member 64 is in the open position, even if the rotating ring 40 is to be rotated, the interlocking member 64 becomes obstructed, so that the rotating ring 40 cannot be rotated. Therefore, when the first valve 26 is opened, the rotating ring 40 is not moved from the connection rotational phase, and the connection between the first connector 10 and the second connector 70 cannot be released.

As described above, by providing the interlocking member 64 and the receiving recess 44, it is possible to reliably prevent the first valve 26 from being opened before the connection of the connector is completed, and the connection of the connector is released while the first valve 26 is opened. Further, as described above, in the present example, since the first gear 62 and the second gear 84 are engaged with each other, the first valve 26 and the second valve 82 are opened and closed synchronously. With this configuration, it is possible to prevent the second valve 82 from being inappropriately opened and closed by the interlock function provided in the first connector 10. Thus, the safety of the liquid hydrogen supply operation can be further improved.

What is claimed is:

1. A connector connection structure comprising:
   a first connector for connection to one of a supply source and a reservoir of liquid hydrogen; and
   a second connector for connection to the other of the supply source and the reservoir, wherein:
   the first connector includes comprises:
   a main body,
   a first connecting surface that is fixed to the main body and abuts a second connecting surface of the second connector,
   a rotating ring that surrounds the first connecting surface and is rotatable with respect to the first connecting surface, and
   a restricting pin that prohibits a rotation of the rotating ring with respect to the first connecting surface;
   when the rotating ring takes a predetermined rotational phase with respect to the second connector, the rotating ring is able to pull in the second connector in an axial direction to an abutting position at which the second connecting surface abuts the first connecting surface, and further, rotates with respect to the first connecting surface in a state where the second connector is pulled in to the abutting position and partially engages with the second connector so as to maintain a connection state; and
   when the second connector is pulled in to the abutting position, the restricting pin moves from a restricting position at which the rotation of the rotating ring is prohibited to an allowable position at which the rotation of the rotating ring is allowed, wherein:
   when the first connector and the second connector are connected to each other, the rotating ring takes a predetermined connection rotational phase with respect to the first connecting surface; and
   the first connector further includes
   a first valve that opens and closes a flow path of the liquid hydrogen, and
   an interlocking member that prohibits opening of the first valve when the rotating ring does not take the connection rotational phase, and prohibits a rotation of the rotating ring from the connection rotational phase when the first valve is opened, wherein the interlocking member is non-circular and physically connected to the first valve.

2. The connector connection structure according to claim 1, wherein:
   the interlocking member is positioned at a closed position at which the interlocking member does not interfere with the rotating ring when the first valve is closed, and moves with the first valve so as to be positioned at an open position when the first valve is opened;
   the rotating ring is provided with a receiving recess in a portion in a circumferential direction;
   when the rotating ring does not take the connection rotational phase, the rotating ring interferes with the interlocking member in a process of moving from the closed position to the open position;
   when the rotating ring takes the connection rotational phase, the rotating ring receives at least part of the interlocking member positioned at the open position in the receiving recess; and
   when the interlocking member is partially received in the receiving recess, the rotation of the rotating ring with respect to the first connecting surface is restricted.

3. The connector connection structure according to claim 1, wherein:
   the first connector further includes
   an opening-closing lever that is mechanically connected to the first valve and opens and closes the first valve by being operated, and
   a first gear that rotates with the opening-closing lever;
   the second connector further includes:
   a second valve that opens and closes the flow path of the liquid hydrogen, and
   a second gear that rotates with the second valve and meshes with the first gear when the first connector is connected to the second connector; and
   when the first gear and the second gear mesh with each other, the first valve and the second valve are opened and closed in synchronization with each other.

4. A connector connection structure comprising:
a first connector for connection to one of a supply source and a reservoir of liquid hydrogen; and
a second connector for connection to the other of the supply source and the reservoir, wherein:
the first connector comprises:
   a main body,
   a first connecting surface that is fixed to the main body and abuts a second connecting surface of the second connector,
   a rotating ring that surrounds the first connecting surface and is rotatable with respect to the first connecting surface, and
   a restricting pin that prohibits a rotation of the rotating ring with respect to the first connecting surface;
when the rotating ring takes a predetermined rotational phase with respect to the second connector, the rotating ring is able to pull in the second connector in an axial direction to an abutting position at which the second connecting surface abuts the first connecting surface, and further, rotates with respect to the first connecting surface in a state where the second connector is pulled in to the abutting position and partially engages with the second connector so as to maintain a connection state; and
when the second connector is pulled in to the abutting position, the restricting pin moves from a restricting position at which the rotation of the rotating ring is prohibited to an allowable position at which the rotation of the rotating ring is allowed, wherein:
the main body is provided with a flange portion that protrudes in a radial direction;
the first connector further includes
   a rotating body that surrounds the main body and is rotatable together with the rotating ring with respect to the main body,
   a pin hole that extends in the axial direction so as to extend across the rotating body and the flange portion and into which the restricting pin is inserted, and
   a pressing pin of which a first part protrudes from the first connecting surface and a second part is inserted into the pin hole;
the restricting position is a position at which the restricting pin extends in both of the flange portion and the rotating body, and the allowable position is a position at which the restricting pin is completely separated from the flange portion; and
when the pressing pin is pressed in the axial direction by the second connecting surface, the pressing pin and the restricting pin are moved back in the axial direction in a chain manner, and the restricting pin moves from the restricting position to the allowable position.

* * * * *